July 12, 1927.
C. ANDRADE, JR
1,635,599
CONTROL ELEMENT FOR CLUTCHES
Filed May 25, 1923
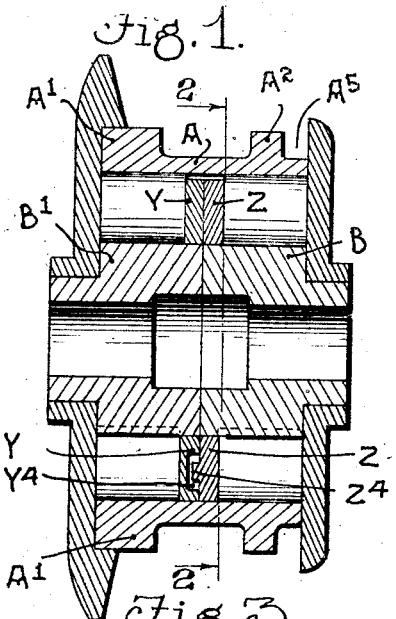
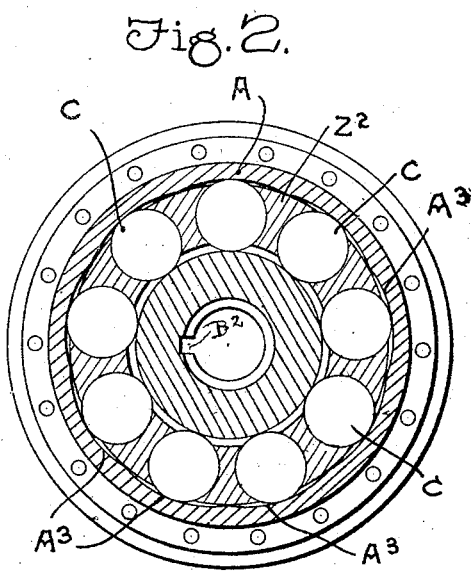
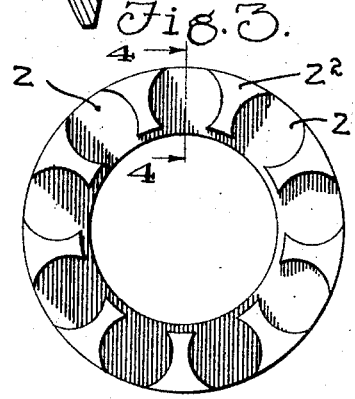
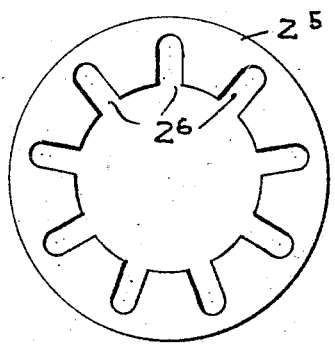
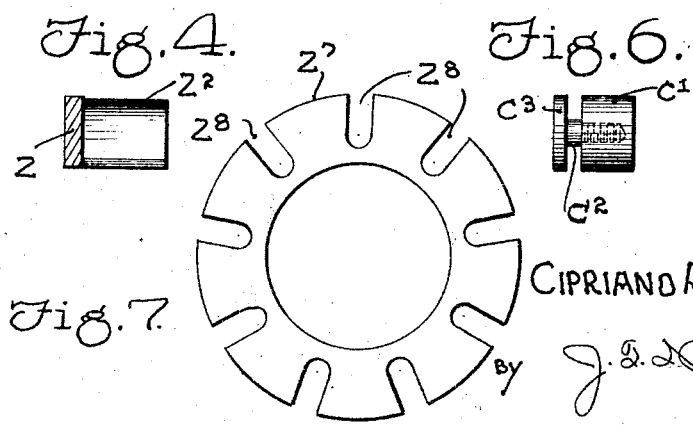
Inventor
CIPRIANO ANDRADE, JR.
By J. D. Newton
Attorney Patented July 12, 1927.

1,635,599

UNITED STATES PATENT OFFICE.

CIPRIANO ANDRADE, JR., OF NEW YORK, N. Y.

CONTROL ELEMENT FOR CLUTCHES.

Application filed May 25, 1923. Serial No. 641,498.

My invention relates to control elements for clutches. My present device is a continuation in part of my original application Serial No. 597,707, filed October 30, 1922.

I attain these objects by the mechanism illustrated in the accompanying drawings, in which—

Fig. 1 is a sectional view of a differential embodying the control element.

Fig. 2 is a view on the line 2—2 of Fig. 1.

Fig. 3 is an end view of one form of the elemental members of my differential.

Fig. 4 is a view on the line 4—4 of Fig. 3.

Fig. 5 is a view of a modified form of the control member.

Fig. 6 is a view of one of the rollers to be used with the control members shown in Figs. 5 and 7.

Fig. 7 is a view of a second modified form of control member.

Referring to the details of the drawing in which the same letter denotes corresponding parts throughout all the views, A is the driving member of my differential having reinforcements A' and A² to withstand the radial thrust of the rollers. B is a driven member and B' another driven member having a groove B² into which the ends of the axle, say, of an automobile may be keyed.

On the interior of the driving member A are formed a plurality of arcs A³ which meet. These arcs are on smaller radii than the general internal radius of the driving member A, and in each of said arcs is located a roller C the cylindrical surface of which is on a still smaller radius than are the arcs A³. In the modification shown in Figs. 2, 3 and 4, these rollers are held in fixed relation to each other by control members Y and Z but the rollers may revolve on their respective axes. The control member Z has integral therewith lugs Z² bounded by arc-shaped faces as shown in Figures 2 and 3, leaving recesses in which the rollers C operate. These rollers C are also located in the arcs A³. It is evident from the construction shown that when the driving member A is operated in either direction, the rollers will clutch and hold the driven member B.

It is apparent from the drawings also that the control member Z being integral with the lugs Z² that the rollers are kept in the same position relative to each other so that each roller working in its arc will cooperate with all the other rollers to clutch or unclutch the driving from the driven member and thus equally distribute the clutch action to all the rollers and the control members with their integral lugs will keep the rollers in their forward or backward movement relative to the driving and driven members in either, the same relative distances or positions from each other. It is to be understood of course that the control member Y is similar in all respects to the control member Z and that the rollers cooperating with the control member Y fit in arcs in the driving member A in the same way as the rollers of the control member Z.

In order that there may not be accidentally too great a displacement between the control members Y and Z, I provide a slot Y⁴ in the control member Y and a lug Z⁴ on the control member Z fitting thereinto. This lug has a limited motion in the slot and prevents too great a displacement between the control members Y and Z.

In the modification shown in Fig. 5, the control member Z⁵ has internal radial slots Z⁶ therein and a roller C' has in it a screw-threaded hole into which may be screwed a screw C² having a head C³ thereon. The space left between the head C³ and C¹ is occupied by the body of the control member Z⁵. The roller C¹ can of course operate in the arcs A³ similar to the rollers C of the modification shown in Fig. 2.

In the modification shown in Fig. 7, the control member Z⁷ has externally opening slots Z⁸ and a roller similar to the roller shown in Fig. 6 may be used with this modification, in which case the control member Z⁷ would rest in the slot between the head C³ and C¹ of the roller similar to the modification shown in Fig. 5.

It will be noticed that in all these modifications the rollers are free to revolve on their respective axes. This will prevent excessive wear at any one place on their wearing surface.

It is apparent that various other modifications might be used instead of the modifications shown and I do not wish my invention, therefore, to be limited to these three modifications.

Having described my invention in detail, what I claim as new is:

1. A clutch comprising driving and driven members, a control element and rollers between the driving and driven members, said rollers being freely movable circumferentially in relation to the driven member, said rollers having a limited circumferential movement in relation to the driving member, the control element having connections with the rollers to compel said rollers to maintain a constant circumferential distance from one another, while permitting said limited circumferential movement of the rollers relative to the driving member, the connections of said control member between the radially intermediate side surfaces of said rollers having a thickness considerably less than the diameter of the rollers, said driving member being provided with arcs permitting the rollers to clutch in either a forward or reverse movement of the driving member.

2. A clutch comprising driving and driven members, rollers between the driving and driven members, and a control member having a multiplicity of lugs said rollers being interposed between and in contact with the lugs, said lugs between the radially intermediate side surfaces of said rollers having a thickness considerably less than the diameter of the rollers, said lugs holding all of said rollers in such relative position that said rollers may have circumferential motion in constant circumferential distance from one another.

3. A clutch comprising driving and driven members, a control element and rollers revoluble on their axes between the driving and driven members, the control element having connections with the rollers without lost motion therebetween to compel said rollers to maintain a constant circumferential distance from one another, the rollers being separated from each other by distances less than the diameter of said rollers, said driving member being provided with arcs which meet each other, permitting the rollers to clutch in either a forward or reverse movement of the driving member.

CIPRIANO ANDRADE, Jr.